Oct. 27, 1953  V. L. BIGSBY ET AL  2,657,120
CHEMICAL REACTOR
Filed Aug. 15, 1949  3 Sheets-Sheet 1

Inventors:
Vernon L. Bigsby,
Alexander J. Petraline
by their Attorneys
Howson & Howson Oct. 27, 1953    V. L. BIGSBY ET AL    2,657,120
CHEMICAL REACTOR
Filed Aug. 15, 1949    3 Sheets-Sheet 2
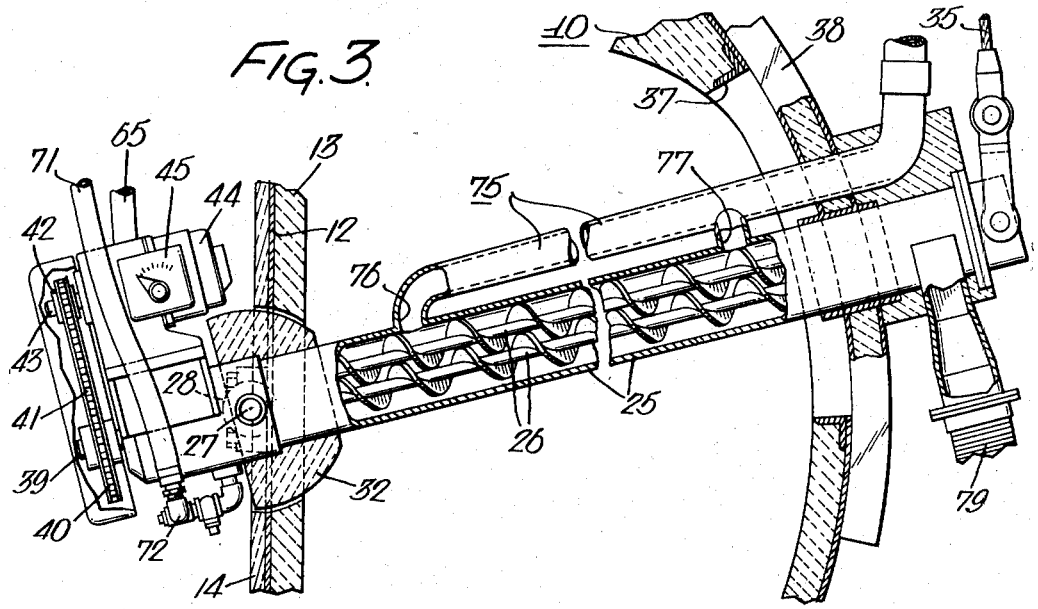
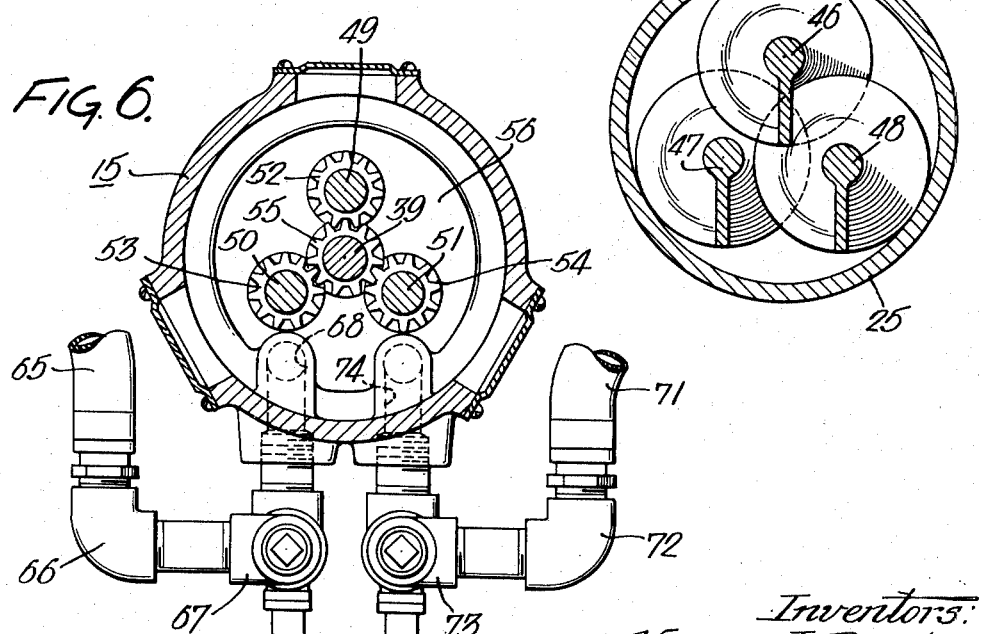
Inventors:
Vernon L. Bigsby
Alexander J. Petraline
by their Attorneys
Howson & Howson Oct. 27, 1953

V. L. BIGSBY ET AL 2,657,120

CHEMICAL REACTOR

Filed Aug. 15, 1949

Inventors:
Vernon L. Bigsby,
Alexander J. Petraline
by their Attorneys
Howson & Howson

UNITED STATES PATENT OFFICE 2,657,120

CHEMICAL REACTOR

Vernon L. Bigsby, Malvern, and Alexander J. Petraline, Phoenixville, Pa., assignors to Warner Company, Philadelphia, Pa., a corporation of Delaware Application August 15, 1949, Serial No. 110,402

5 Claims. (Cl. 23—277)

This invention relates to a process and apparatus for continuously reacting materials which, by chemical reaction, form a product that is a solid or semi-solid, e. g. sticky, gummy, adherent material, the reaction in its initial stage involving a liquid either by virtue of the fact that one or all of the reactants is a liquid or by virtue of the fact that a liquid is formed during the initial stage of the reaction.

While the invention is applicable generally to reactions of the type above mentioned, it will be described by way of example as applied to the continuous production of hydrogen sulphide gas. A well-known method of forming such gas is by the direct reaction, at elevated temperatures, of elemental sulphur and a hydrocarbon such as petroleum oil. In the practice of this known method, both of the reactants are substantially in liquid condition at the temperatures prevailing during the reaction. The gaseous hydrogen sulphide formed by the reaction is evolved in a comparatively pure condition. A by-product of the reaction is a coke which is either quite solid or of an asphaltic nature under the conditions prevailing during the reaction.

Prior to the present invention, the production of hydrogen sulphide gas by the above-mentioned method was a batch procedure, as it was necessary periodically to interrupt the operation of the reactor in order that it might be cleansed of the coke residue which is either a solid or viscous tar-like mass depending upon the extent to which the reaction is carried out. The removal of this residue involved manual scraping or dumping or a combination of both, the removal of the solid coke residue presenting a particularly difficult problem. This adds considerably to the cost of producing the hydrogen sulphide gas. Furthermore, because the contents of the reaction vessel, while initially liquid, approach a condition of high viscosity and finally convert to solids or semisolids as the reaction proceeds under the impetus of applied heat, it is not practical to stir or agitate the reactants for the reason that the solids would jam and stop the agitating mechanism. Likewise, because of the great difference in viscosity between the various liquid phases existing during the reaction, it is not possible to keep the materials properly mixed during the reaction, the heavy liquids tending to remain near the bottom of the reaction vessel while the lighter liquids float to the top. This poor mixing of the reacting materials, when reacting liquid hydrocarbons with sulphur on a batch basis, results in a low yield of hydrogen sulphide and poor efficiency from the reaction.

The principal object of the present invention is to provide a method and apparatus by which a reaction, such as that involved in the above-mentioned method of producing hydrogen sulphide gas, can be carried out continuously and with high efficiency.

In accordance with the present invention, the materials to be reacted are continuously brought together, and as the reaction proceeds, the solid or semisolid product is moved upwardly along an inclined rectilinear path, while the liquid present in the initial stage of the reaction is gravitationally restrained in the lower part of said path. The main part of the reaction at least occurs in the lower part of the path where the liquid is restrained and the reactants are agitated in this portion of the path to insure an intimate contact therebetween and thus to provide a substantially complete reaction. From an apparatus standpoint, an important feature of the invention is the employment of a multiple screw arrangement for moving the solid or semisolid by-product in the manner above mentioned. This is based upon the discovery that, if screw flights are properly arranged inside of the reaction vessel, the reaction may be carried out continuously because the screw flights prevent the building up or accumulation of the solid or semisolid by-product. The arrangement is such that the screw flights mutually clean each other as they are rotated and all of the flights clean the inside of the reaction vessel. In addition the screw flights provide the desired agitation in the portion of the path where the liquid is gravitationally restrained.

Reference is now made to the accompanying drawings, wherein there is illustrated a particular embodiment of the apparatus provided by the invention, and by means of which the novel process of the invention may be carried out.

In the drawings:

Fig. 3 is a sectional view, on larger scale, taken longitudinally of the reactor;

Fig. 6 is a sectional view taken along line 6—6 of Fig. 4; and

Fig. 7 is a sectional view taken along line 7—7 of Fig. 4.

Figure 1:
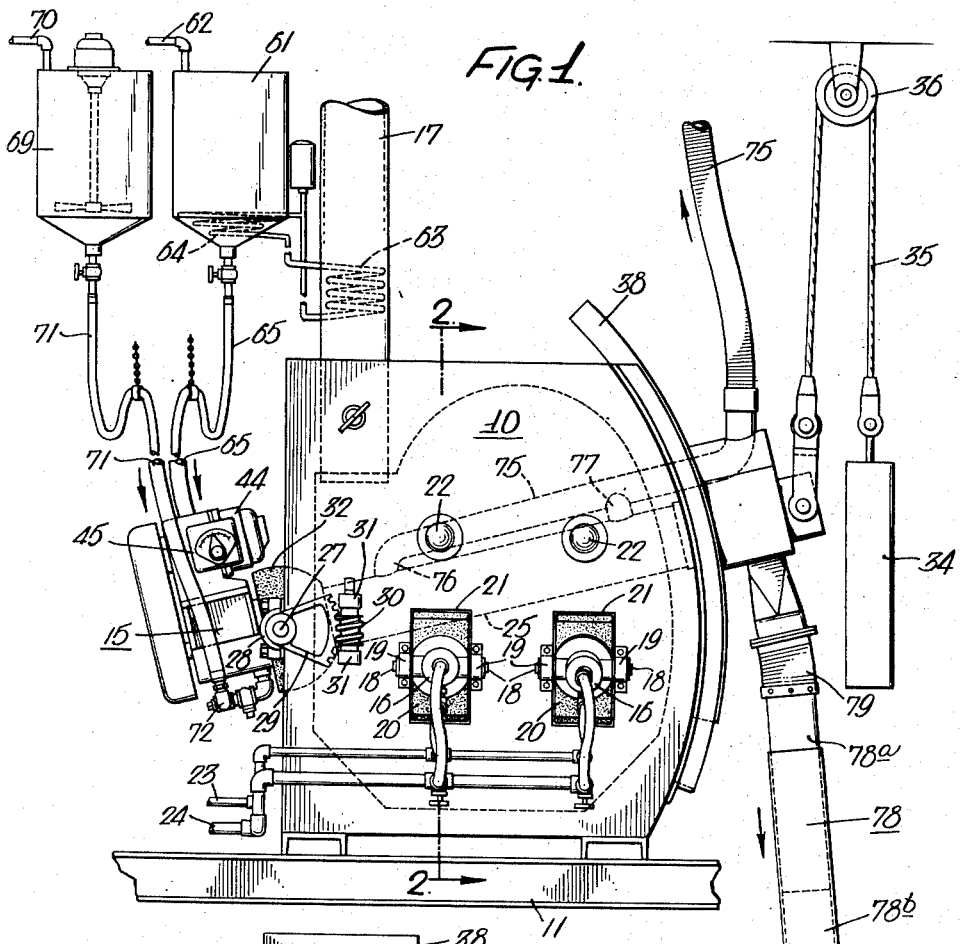
Fig. 1 is a side elevational view of the apparatus.
Figure 2:
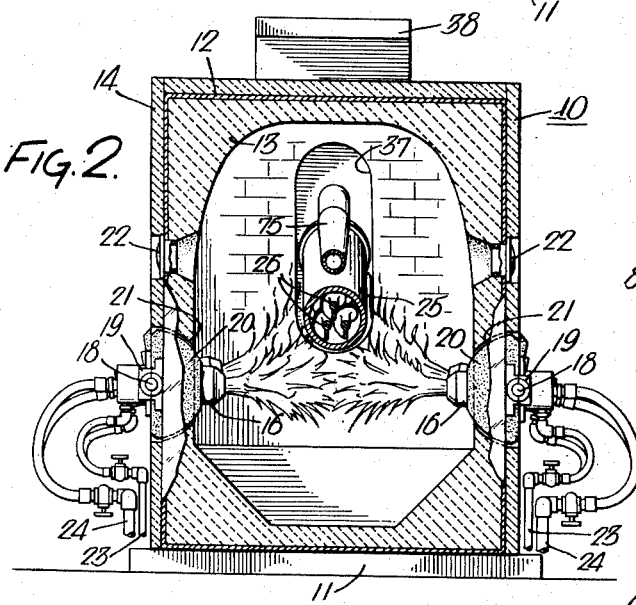
Fig. 2 is a sectional view taken along line 2—2 of Fig. 1.

Referring first to Figs. 1 and 2, there is shown a furnace-like structure 10 mounted on a supporting framework 11. As may be seen in Fig. 2, the structure 10 may comprise a steel enclosure 12 lined on its inside with fire brick 13 and having a heat insulation jacket 14 on its outside. A reactor 15 of tubular form extends through the furnace-like structure, and is subjected to heat from suitable heat-supplying means which may comprise a plurality of similar oil burners 16. In the particular embodiment illustrated, there are two oil burners on each side of the furnace-like structure, although it will be understood that any desired number may be employed and that they can be adjusted to give the desired temperature to the reactor, which may vary along the length of the reactor if desired. A stack 17 extends upwardly from the upper part of structure 10 as in the case of any furnace.

Each of the oil burners is provided with mounting trunnions 18 which are rotatably supported by bearings 19 secured to the steel casing 12. By this arrangement, each of the oil burners is pivotally adjustable to vary its effect upon the reactor. As may be seen in Fig. 2, each of the oil burner units has mounted thereon a fire brick section 20 which is associated with a complemental opening 21 in the fire brick lining 13. Windows 22 are provided in the sides of the furnace-like structure for observation purposes, particularly during adjustment of the oil burners. The oil burners are supplied with oil and air through pipes 23 and 24.

Figure 4:
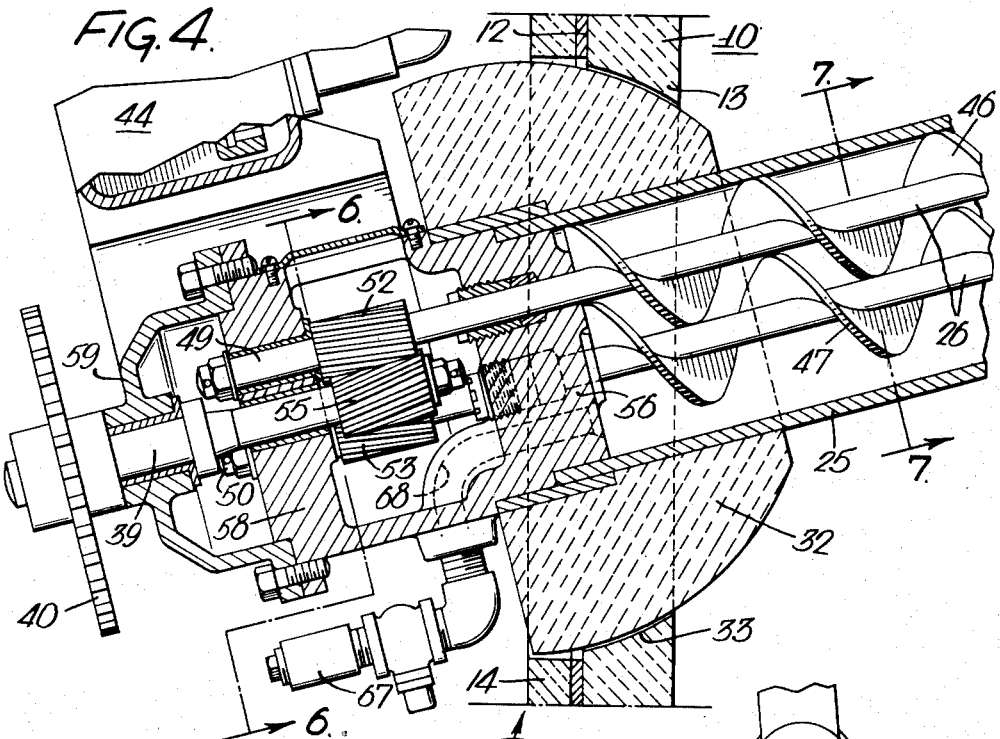
Fig. 4 is a large-scale sectional view of the portion of the apparatus at the inlet end of the reactor.

As may be seen in Fig. 3, the reactor 15 comprises a tubular casing 25 and multiple screw mechanism 26 disposed within said casing. At the inlet end of the reactor, external to the structure 10, the reactor is provided with trunnions 27 which are disposed in journals 28. The reactor extends upwardly at an acute angle, and it is adjustable as to angularity by means of a gear segment 29 (see Fig. 1) carried by one of the trunnions 27 and a manually-operable worm 30 mounted in bearings 31 on the side of the structure 10. A fire brick section 32 (Fig. 4) is carried by the reactor and cooperates with a complemental opening 33 in the wall of structure 10.

At the opposite end of the reactor, there is provided a counterweight arrangement comprising a weight 34 (see Fig. 1), a cable 35 and a supporting pulley 36, one end of the cable being fastened to the weight 34 and the other end being fastened to the reactor. By this arrangement, the reactor is supported in any position to which it is adjusted. As may be seen in Fig. 3, an opening 37 is provided in the structure 10 to permit the angular adjustability of the reactor 15 (see Fig. 6), and a fire brick door 38 is mounted on the reactor and serves to maintain closure of the opening 37 for any position of the reactor.

It is to be understood that if the conditions of any particular reaction have been standardized so that there will be no need for adjustment of the angularity of the reactor, the mechanisms at the inlet and outlet ends of the reactor may be omitted from the apparatus. The particular angularity employed in any given case, either by adjustment or by a permanent setting, will depend on the rate of feed of reactants, the rate of reaction as controlled by the heat supplied and the like. In general, the angularity will be between about 5° and about 30° from the horizontal and usually an angularity between about 8° and about 20° will be used.

The multiple screw mechanism, which has been designated generally by reference character 26, is driven through a common shaft 39 (see Fig. 4) which carries a driving sprocket or pulley 40, the latter being connected by driving chain or belt 41 (Fig. 3) to a sprocket or pulley 42 on the shaft 43 of a motor drive unit 44 comprising an electric motor and reducing gear. Adjustable speed control means 45 enables adjustment of the speed at which shaft 39 is driven.

Figure 5:
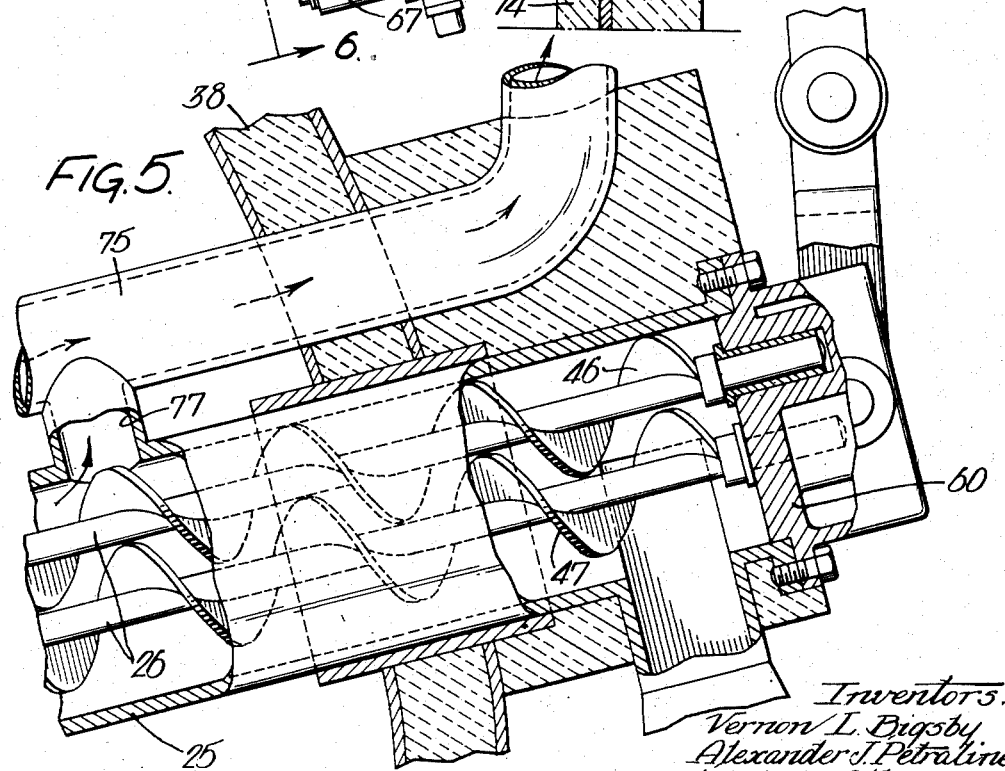
Fig. 5 is a large-scale sectional view of the portion of the apparatus at the outlet end of the reactor.

In the embodiment illustrated, the multiple screw mechanism comprises three screws 46, 47 and 48, as may be seen in Fig. 7. At the feed end of the reactor, the screws have extended shafts 49, 50 and 51 (see Figs. 4 and 6) which carry spiral gears 52, 53 and 54 in common mesh with a spiral gear 55 on the common drive shaft 39. As may be seen in Fig. 4, the screw shafts extend through a wall 56 which serves to close the feed end of the reactor casing or housing 25 wherein the screws are disposed. The end portions of the screw shafts are journaled in a supporting wall 58, as is also the drive shaft. The latter is also journaled in the end wall 59. At the opposite end of the reactor, the screw shafts are journaled in the end wall 60 as may be seen in Fig. 5.

The three screws are constructed and arranged so that they mutually clean each other and they also clean the inside of the reactor casing 25. As may be seen in Figs. 4, 5 and 7, the outer edges of each screw flight almost touches the axles of the other two screws, as the three screws revolve in the same direction, and furthermore the outer edges of the screw flights effectively wipe over the inner surface of the cylindrical casing. This is an important feature of the reactor by virtue of which the solid or semi-solid by-product hereinbefore mentioned is moved continuously and is prevented from accumulating within the reactor, even though such by-product may be sticky, gummy, adherent material.

In the preferred embodiment as stated, three screws are employed and by the use of three screws effective cleaning of the inside of a tubular reactor is provided. In place of the three screws, two, four or more may be used but in any case, the shape of the interior of the reactor will be constructed to afford effective cleaning thereof by the action of the particular number of screws present in the apparatus, for example, when two screws are employed, the reactor will be oval in shape.

In the illustrated apparatus, which is adapted particularly for the continuous production of hydrogen sulphide gas, the materials to be reacted are shown as being fed separately to the lower or feed end of the reactor. Referring to Fig. 1, there is provided a tank 61 to which oil may be supplied through pipe 62. The waste heat from stack 17 may be utilized to heat the oil in tank 61, and to that end there is provided a heating arrangement comprising a conduit coil 63 within the stack connected to a conduit coil 64 in the lower part of the tank 61. A heat transfer medium, such as water, may be utilized in the heating system constituted by the connected coils. The heated oil flows from the bottom of tank 61 through a flexible conduit 65 which is coupled by fittings 66 and 67 to a passage 68 (see Fig. 6) extending through wall 56 to the inside of the reactor.

The sulphur may be supplied in molten form to a tank 69 through feed pipe 70. From the tank 69, the sulphur flows through flexible conduit 71 which is coupled by fittings 72 and 73 to a passage 74 (see Fig. 6) which extends through the wall 56 to the inside of the reactor.

In place of using separate feeds for the reactants, they may be mixed in a single tank and the mixture fed to the reactor, provided, of course, that there is not an appreciable reaction until the mixture reaches the reactor. Thus, the sulphur, in solid or molten condition, may be suspended in the hydrocarbon and the mixture then added to the reactor. Likewise, one or more solid reactants such as solid sulphur or solid paraffin, may be added to the reactor and converted to a liquid in the reactor by the heat supplied thereto.

The gaseous hydrogen sulphide formed by the reaction passes off through conduit 75 (see Fig. 3) which communicates with the inside of the reactor at 76 and 77. If the hydrogen sulphide contains volatile light hydrocarbons, the effluent gas can be passed through a condenser for removal of the hydrocarbons, which can then be added to the hydrocarbon feed. The solid or semi-solid by-product is carried by the screws to the upper end of the reactor at which there is a discharge opening leading to the discharge conduit 78. The latter has expansible and contractible sections 78a and 78b and flexible connectors 79 and 80 to permit the above-described angular adjustment of the reactor, and it leads to a rotary star wheel 81 driven from motor 82 through a worm 83 and worm wheel 84. The star wheel feeds the solid or semi-solid material to a removal screw conveyor 85.

The rotary star wheel illustrated in the drawings and described above insures that air will not be admitted to the reactor when the by-product coke is discharged. It is desirable to exclude air, not only in order not to dilute the hydrogen sulphide, but also to avoid the formation of an explosive mixture in the reactor. For these reasons and to avoid a loss of hydrogen sulphide, the reactor itself is made gas-tight. While the reactor may be operated at sub- or super-atmospheric pressure, the use of substantially atmospheric pressure is preferred.

In place of using the rotary star wheel, any other system that prevents access of air may be used, for example, a Fuller-Kenyon pump mechanism; a bell-hopper arrangement; or even a collecting box of considerable height in which case, the product is removed manually from the box, the level of product in the box being maintained at a sufficient height to prevent an updraft of air into the reactor. It is desirable to maintain the solid or semi-solid material discharged from the reactor out of contact with the air until it has cooled, preferably to below 200° F. because at elevated temperatures, the material may ignite spontaneously. Any of the discharge means described can be operated to provide any necessary cooling of the product.

In operation of the apparatus, the liquid is gravitationally retained in the lower part of the reactor and as the reaction proceeds, the products of the reaction are continuously removed. Hydrogen sulphide gas passes off through the conduit 75, and at the same time the solid or semi-solid by-product is removed as fast as it is formed without any accumulation in the reactor. It is important to note that the screw flights not only serve the purpose hereinbefore mentioned but they also serve to keep the reactants mixed at the feed end of the reactor which is inclined sufficiently so that the screw flights in the lower part of the reactor are immersed in the liquid reactants.

The dimensions of the reactor in any instance will, of course, be such as to accommodate the particular reaction which is to be carried out. In one physical embodiment for the production of hydrogen sulphide gas, the reactor was in the form of an elongated cylinder having a length of 7 feet and a cross-sectional inside diameter of 12 inches. It will be apparent also that the pitch of the screw flights may vary according to specific requirements and in the particular physical embodiment described, the screws were standard 6 inch screw conveyor flights.

It will be apparent that the reaction may be controlled by varying the rate of input of the reactants, by varying the speed of the revolving screws, by varying the angle of inclination of the reactor, by varying the pressure under which the reaction takes place, and by varying the heat applied to the reactor. By the present invention, it is possible to control these conditions to provide a maximum yield of hydrogen sulphide and to obtain a low-sulphur coke which is brittle and does not possess an offensive odor. The process is preferably operated to provide a coke of these characteristics, rather than a semi-solid product which has often been obtained as a by-product in the prior batch processes.

The following is given as an illustrative example and not as limiting the invention:

A mixture of 100 pounds of pulverized sulphur and 100 pounds of No. 5 fuel oil was fed into the reactor at the rate of one gallon of feed per hour. A feed temperature of from 74° to 86° F. was maintained. The reactor was inclined at an angle of 8° and was maintained at a temperature between 490° F. and 535° F. at the feed end, and between 770° F. and 850° F. at the discharge end. The hydrogen sulfide gas was evolved from the reactor and collected at a temperature of from 98° F. to 110° F. The reactor was operated at 8 R. P. M. and the entire charge was fed to the reactor and reacted continuously to obtain a yield of 79% hydrogen sulphide based on the sulphur input. The coke obtained was brittle and after cooling did not have an offensive odor.

While the foregoing description has dealt primarily with the production of hydrogen sulphide gas, and as a by-product, coke, by the reaction between sulphur and a hydrocarbon oil, it will be apparent that the process is applicable to any reaction involving, at an early stage, a liquid, and forming, as a result of the reaction, a semi-solid or solid product with or without the accompanying formation of a gas. For example, in addition to the oil-sulphur reaction described above, other examples of the use of the process and apparatus that may be mentioned are: the distillation of a heavy hydrocarbon oil or pitch to obtain volatile hydrocarbons and coke; the reaction between finely ground hard or soft coal and sulphur; the destructive distillation of bituminous coal or soft or hard wood, for example, the fluidized distillation of hard wood wherein liquid tar or pitch is initially formed; processes involving the reaction of the components of two solutions to form a precipitate in which case the water is evolved as steam; and catalytic processes in which a liquid hydrocarbon is reacted in the presence of a solid catalyst to form gaseous hydrocarbons and wherein the catalyst is removed from the reactor and may subsequently be returned thereto. In each of these reactions, a pool of liquid is maintained at the lower end of the inclined path while semi-solid or solid cokelike material formed by the reaction is continuously and forcefully moved upwardly at an acute angle out of contact with the liquid, adhering liquid draining back to the lower end of the path for continuance of the reaction.

We claim:

1. Apparatus for effecting a continuous chemical reaction of materials by continuous mixing of the supplied materials, which reaction involves a liquid at least during the initial stage and forms a product that is at least semisolid and may be sticky or gummy, said apparatus comprising a tubular reactor casing inclined at an acute angle to the horizontal, means for supplying the materials to be reacted to the lower end of said casing, means for continuously mixing the supplied materials in the lower part of said casing and for continuously moving the aforementioned product upwardly within said casing while preventing accumulation of said product, said last means comprising a plurality of intermeshed screws within said casing, each screw having its helical edge in close proximity to the axle of each other screw and also in close proximity to the inner wall of said casing to prevent accumulation of said product by cleaning action of the screws upon one another and upon the casing wall, means for rotating said screws in the same direction to effect the aforementioned functions while the liquid involved in the reaction is gravitationally restrained in the lower part of the reactor casing, and means for conveying said product from the upper part of said casing.

2. Apparatus for effecting a continuous chemical reaction of materials by continuous mixing of the supplied materials, which reaction involves a liquid at least during the initial stage and forms a product that is at least semisolid and may be sticky or gummy, said apparatus comprising a tubular reactor casing of circular cross-section inclined at an acute angle to the horizontal, means for supplying the materials to be reacted to the lower end of said casing, means for continuously mixing the supplied materials in the lower part of said casing and for continuously moving the aforementioned product upwardly within said casing while preventing accumulation of said product, said last means comprising three intermeshed screws within said casing, each screw having its helical edge in close proximity to the axle of each other screw and also in close proximity to the inner wall of said casing to prevent accumulation of said product by cleaning action of the screws upon one another and upon the casing wall, means for rotating said screws in the same direction to effect the aforementioned functions while the liquid involved in the reaction is gravitationally restrained in the lower part of the reactor casing, and means for conveying said product from the upper part of said casing.

3. Apparatus for effecting a continuous chemical reaction of materials by continuous mixing of the supplied materials, which reaction involves a liquid at least during the initial stage and forms a product that is at least semisolid and may be sticky or gummy, said apparatus comprising a walled furnace-like structure, a tubular reactor casing extending within said structure and externally thereof at an acute angle to the horizontal, means within said structure for heating said casing, means for supplying the materials to be reacted to the lower end of said casing, means for continuously mixing the supplied materials in the lower part of said casing and for continuously moving the aforementioned product upwardly within said casing while preventing accumulation of said product, said last means comprising a plurality of intermeshed screws within said casing, each screw having its helical edge in close proximity to the axle of each other screw and also in close proximity to the inner wall of said casing to prevent accumulation of said product by cleaning action of the screws upon one another and upon the casing wall, means for rotating said screws in the same direction to effect the aforementioned functions while the liquid involved in the reaction is gravitationally restrained in the lower part of the reactor casing, and means for conveying said product from the upper part of said casing.

4. Apparatus for effecting a continuous chemical reaction of materials by continuous mixing of the supplied materials, which reaction involves a liquid at least during the initial stage and forms a product that is at least semisolid and may be sticky or gummy, said apparatus comprising a walled furnace-like structure, a tubular reactor casing extending through said structure at an acute angle to the horizontal, means pivotally mounting the lower end of said casing externally of said structure to permit adjustment of said casing to a desired angle, the walls of said structure through which said casing extends having openings to permit the adjustment of said casing, means for maintaining closure of said openings for any position of said casing, means for supporting the upper end of said casing in any position of adjustment, means within said structure for heating said casing, means for supplying the materials to be reacted to the lower end of said casing, means for continuously mixing the supplied materials in the lower part of said casing and for continuously moving the aforementioned product upwardly within said casing while preventing accumulation of said product, said last means comprising a plurality of intermeshed screws within said casing, each screw having its helical edge in close proximity to the axle of each other screw and also in close proximity to the inner wall of said casing to prevent accumulation of said product by cleaning action of the screws upon one another and upon the casing wall, means for rotating said screws in the same direction to effect the aforementioned functions while the liquid involved in the reaction is gravitationally restrained in the lower part of the reactor casing, and means for conveying said product from the upper part of said casing.

5. Apparatus for effecting a continuous chemical reaction of materials by continuous mixing of the supplied materials, which reaction involves a liquid at least during the initial stage and forms a product that is at least semisolid and may be sticky and gummy, said apparatus comprising a walled furnace-like structure, a tubular reactor casing extending within said structure and externally thereof at an acute angle to the horizontal, the upper part of said casing extending through a wall of said structure, means pivotally mounting the lower end of said casing to permit adjustment of said casing to a desired angle, said wall having a relatively large opening permitting the adjustment of said casing, a closure member carried by said casing and effective to maintain closure of said opening for any position of said casing, means for supporting the upper end of said casing in any position of adjustment, means within said structure for heating said casing, means for supplying the materials to be reacted to the lower end of said casing, means for continuously mixing the supplied materials in the lower part of said casing and for continuously moving the aforementioned product upwardly within said casing while preventing accumulation of said product, said last means comprising a plurality of intermeshed screws within said casing, each screw having its helical edge in close proximity to the axle of each other screw and also in close proximity to the inner wall of said casing to prevent accumulation of said product by cleaning action of the screws upon one another and upon the casing wall, means for rotating said screws in the same direction to effect the aforementioned functions while the liquid involved in the reaction is gravitationally restrained in the lower part of the reactor casing, and means for conveying said product from the upper part of said casing.

VERNON L. BIGSBY.
ALEXANDER J. PETRALINE.

References Cited in the file of this patent

UNITED STATES PATENTS

| Number | Name | Date |
| --- | --- | --- |
| 1,315,534 | Taylor et al. | Sept. 9, 1919 |
| 1,413,045 | MacCarthy | Apr. 18, 1922 |
| 1,565,894 | Bindschelder | Dec. 15, 1925 |
| 1,897,921 | Bacon | Feb. 14, 1933 |
| 2,021,991 | Depew | Nov. 26, 1935 |
| 2,134,365 | Hale | Oct. 25, 1938 |
| 2,173,414 | Fulton | Sept. 19, 1939 |
| 2,211,734 | Soderberg | Aug. 13, 1940 |
| 2,238,864 | Pratt | Apr. 15, 1941 |
| 2,474,066 | Preisman | June 21, 1949 |